US008073385B2

United States Patent
Braithwaite et al.

(10) Patent No.: US 8,073,385 B2
(45) Date of Patent: Dec. 6, 2011

(54) ADAPTIVE ECHO CANCELLATION FOR AN ON-FREQUENCY RF REPEATER WITH DIGITAL SUB-BAND FILTERING

(75) Inventors: Richard Neil Braithwaite, Orange, CA (US); Scott Carichner, Rancho Santa Margarita, CA (US); Mark Cope, Bath (GB)

(73) Assignee: Powerwave Technologies, Inc., Santa Ana, CA (US)

( * ) Notice: Subject to any disclaimer, the term of this patent is extended or adjusted under 35 U.S.C. 154(b) by 371 days.

(21) Appl. No.: 12/468,710

(22) Filed: May 19, 2009

(65) Prior Publication Data
US 2009/0291632 A1 Nov. 26, 2009

Related U.S. Application Data

(60) Provisional application No. 61/128,366, filed on May 20, 2008.

(51) Int. Cl.
*H04B 1/60* (2006.01)
(52) U.S. Cl. ........................................... 455/9
(58) Field of Classification Search .................. None
See application file for complete search history.

(56) References Cited

U.S. PATENT DOCUMENTS 6,996,229 B2 * 2/2006 Gunther .................. 379/406.06
2002/0181699 A1 12/2002 Pham et al.

OTHER PUBLICATIONS

U.S. Appl. No. 12/009,667, filed Jan. 22, 2008, Braithwaite et al.

* cited by examiner

*Primary Examiner* — Lincoln Donovan
*Assistant Examiner* — Sibin Chen
(74) *Attorney, Agent, or Firm* — OC Patent Law Group

(57) ABSTRACT

An adaptive echo cancellation system and method employing an algorithm suitable for a digital repeater with sub-band filtering is disclosed. Cross- and auto-correlation measurements used to estimate the residual coupling are computed from normalized cross and power spectrums which avoid the problems associated with narrow bandwidth signal components. The normalized cross- and power spectra are additionally masked in frequency to reduce the influence of interfering spectral components outside of the passband of the sub-band filter. Regularization of the iterative estimation process is applied to maintain stability and compensate for the bandwidth reduction associated with the sub-band filter and the spectral mask.

20 Claims, 11 Drawing Sheets

ADAPTIVE ECHO CANCELLATION FOR AN ON-FREQUENCY RF REPEATER WITH DIGITAL SUB-BAND FILTERING

RELATED APPLICATION INFORMATION

The present application claims the benefit under 35 USC 119(e) of provisional application Ser. No. 61/128,366 filed May 20, 2008.

BACKGROUND OF THE INVENTION

1. Field of the Invention

The present invention relates to radio frequency (RF) repeaters. More particularly, the present invention relates to echo cancellation systems and methods for an on-frequency RF repeater.

2. Description of the Prior Art and Related Information

An on-frequency RF repeater extends the coverage of a basestation by receiving, filtering, and re-transmitting signals of interest at the same frequency and at a higher power level. Repeaters with high forward gain often exhibit echoes due to RF coupling between the input and output antennas. Echo cancellation is employed to reduce the echo. One approach to echo cancellation which employs autocorrelation techniques is disclosed in T. Pham and M. P. Fuerter, "System for convolutional echo cancellation by iterative autocorrelation", US Patent Application 2002/0181699, Dec. 5, 2002. However, correlation-based methods such as in the above published '699 application can fail when the input signal comprises a strong narrowband component, such as GSM, because the auto-correlation of the input signal and echo overlap.

Accordingly, a need exists for an improved system and method for echo cancellation.

SUMMARY OF THE INVENTION

In a first aspect the present invention provides a wireless repeater, comprising an input antenna for receiving an input signal, an output antenna for outputting an amplified signal, an amplifier for amplifying the received input signal and providing the output amplified signal to the output antenna, a band filter for limiting the input signal to an operational frequency band of the repeater, and a sub-band filter for limiting the output of the band filter to one or more sub-bands within the operational frequency band of the repeater. The repeater further comprises a digital feedback path coupled to the output of the sub-band filter and including a digital signal processor for adaptively canceling an echo between the output antenna and the input antenna by implementing an adaptive algorithm based on cross and autocorrelation measurements obtained from the power spectrum of a signal representing the digital output of the repeater and the cross spectrum of the same repeater digital output signal with the repeater input signal after echo cancellation, where the cross and power spectra are normalized by the power spectrum.

In a preferred embodiment of the wireless repeater the band filter comprises an analog filter and the sub-band filter comprises a digital filter and the repeater comprises a down converter and analog to digital converter before the digital sub-band filter. The digital signal processor preferably implements a frequency weighting mask to weight the cross and power spectrums. The wireless repeater may further comprise a pilot signal source coupled to insert a broad spectrum pilot signal to the output of the sub-band filter to assist in the calculation of the cross and power spectrums. The pilot signal is preferably added to the output of the sub-band filter and the pilot signal is uncorrelated with itself over a delay range spanned by the echo cancellation feedback cancellation algorithm. The digital signal processor preferably implements the algorithm employing a digital filtering operation to cancel echoes using adaptive filter coefficients. Changes in the adaptive filter coefficients are preferably regularized by the algorithm to favor smaller changes in the coefficients. Changes in the adaptive filter coefficients may be regularized by the algorithm employing one of singular value decomposition, penalty method, diagonal padding, and the steepest descent method. The input signal may comprise a narrowband signal and may also further comprise a wideband signal. For example, the narrowband signal may comprise a GSM signal and the wideband signal may comprise a CDMA signal. The repeater is preferably an on frequency repeater. Also, the repeater is preferably a frequency division duplex bi-directional repeater.

In another aspect the present invention provides a method for echo cancellation in a wireless repeater having an input antenna and output antenna. The method comprises receiving an input signal in a signal path of the wireless repeater, filtering the input signal to an operational band of the repeater to provide a band filtered signal, providing a sub-band filtering operation to the band filtered signal to limit the signal to one or more sub-bands within the operational band, determining cross and autocorrelations obtained from the power spectrum of a signal representing the digital output of the repeater and the cross spectrum of the same repeater digital output signal with the repeater input signal after echo cancellation, where the cross and power spectra are normalized by the power spectrum, and canceling an echo between the output antenna and the input antenna by implementing an adaptive filtering operation in a digital feedback path including the output of the sub-band filtering operation by employing adaptive filter coefficients based on cross and autocorrelations obtained from the normalized cross and power spectra.

In a preferred embodiment the method further comprises regularizing changes in the adaptive filter coefficients to favor smaller changes in the coefficients. The regularizing may preferably comprise employing one of singular value decomposition, penalty method, diagonal padding, and the steepest descent method. The normalizing may preferably comprise employing a frequency weighting mask to weight the cross and power spectrums. The normalizing may also preferably comprise inserting a broad spectrum pilot signal to the output of the sub-band filter to assist in the calculation of the cross and power spectrums. The method is preferably implemented in an on frequency repeater where the input signal includes a narrowband signal.

Further features and advantages of the invention will be appreciated by the following detailed description.

DETAILED DESCRIPTION

The present disclosure may incorporate the teachings set out in R. N. Braithwaite and S. Carichner, "Adaptive Echo Cancellation for an On-Frequency RF Repeater using a Weighted Power Spectrum", U.S. patent application Ser. No. 12/009,667 filed Jan. 22, 2008, the disclosure of which is incorporated herein by reference in its entirety.

Figure 1:
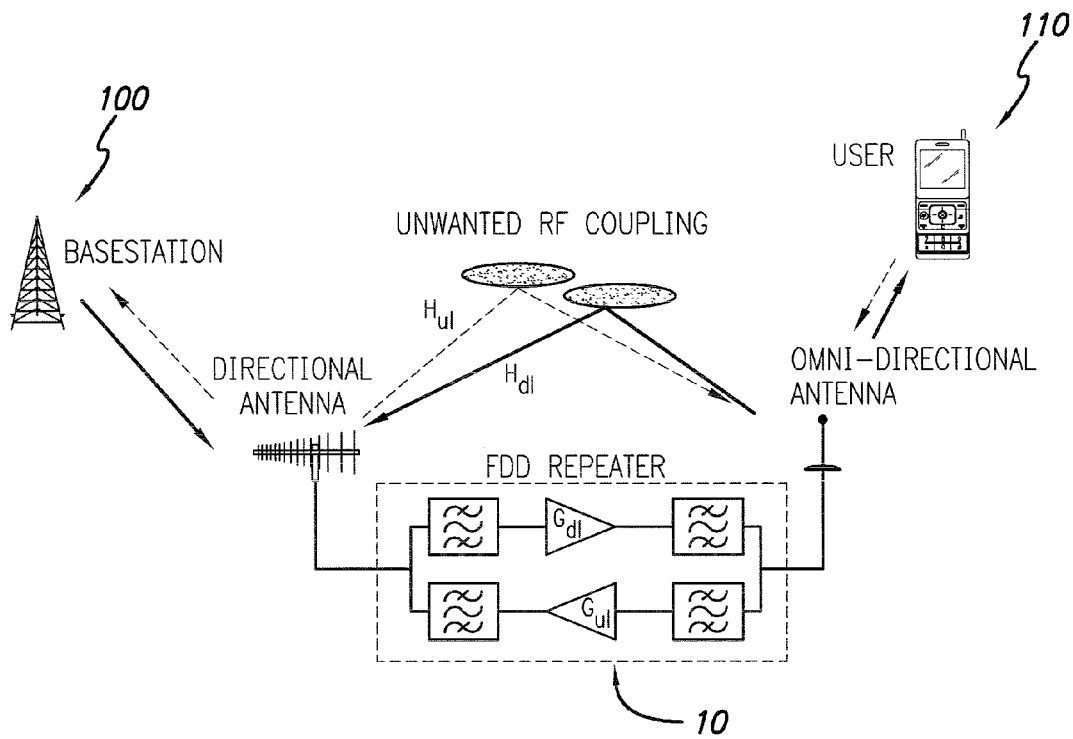
FIG. 1 is a schematic drawing of wireless communication system employing a bi-directional on-frequency repeater connecting the basestation and mobile user.

The present invention provides an improved wireless communication system employing a bi-directional on-frequency repeater in accordance with the invention. An on-frequency RF repeater extends the coverage of a basestation by receiving, filtering, and re-transmitting signals of interest at the same frequency and at a higher power level. Typically the repeater is bi-directional providing gain to both the up link and down link connecting the basestation and mobile user, as depicted in FIG. 1. Unwanted RF coupling between the input and output antennas of a high gain repeater causes delayed and attenuated replicas of the original signal, referred to as "echoes," to be transmitted. In general, echoes are considered undesirable. An internal feedback path within the repeater is used to compensate thus reducing the echo magnitude. This compensation is referred to as "echo cancellation."

Repeaters with high gain require high isolation between the input and output antennas to maintain stability and even more isolation to suppress echoes. Stability requires the product of the repeater gain and the antenna isolation, referred to as the "loop gain", to be less than unity (0 dB) for all frequencies. A loop gain of −10 dB to −15 dB is a typical requirement for good echo suppression and stability margin. The use of directional antennas provides sufficient isolation when the repeater gain is modest; however, to increase the repeater gain further requires echo cancellation.

The filtering applied to the repeated signal limits the bandwidth to a specific channel typically dedicated to a cellular or PCS band and is implemented at an intermediate frequency (IF). This band-limiting makes a digital implementation feasible, from which additional enhancements such as digital sub-band filtering and digital echo cancellation can be incorporated easily. The repeater in the preferred embodiment disclosed herein has a digital IF stage with both digital echo cancellation and digital sub-band filtering.

Figure 2:
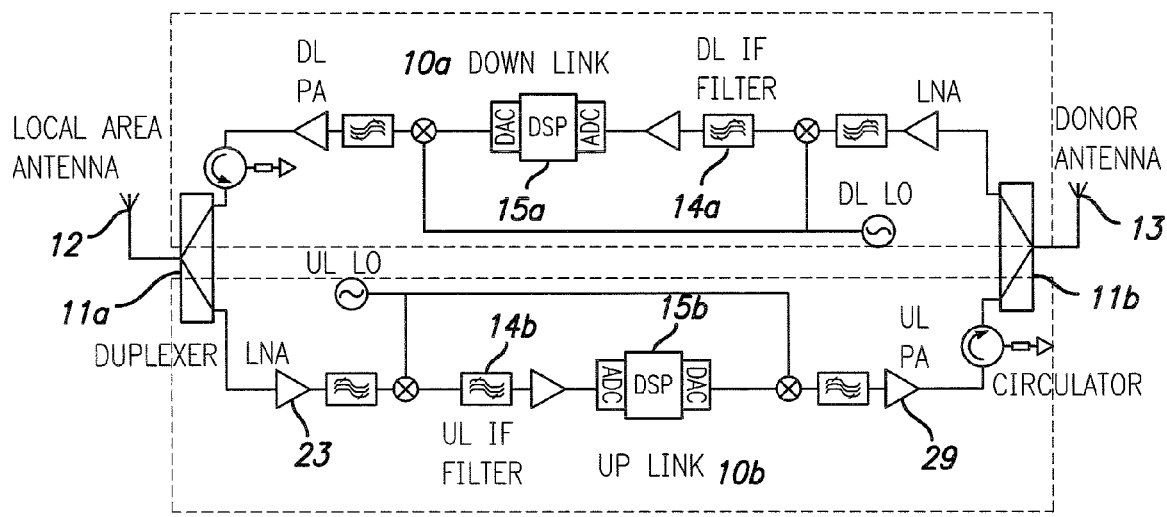
FIG. 2 is a block schematic diagram of the bidirectional digital repeater of FIG. 1.

FIG. 2 shows the block diagram of an on-frequency repeater with a digital IF stage. The repeater is bi-directional using a frequency division duplex (FDD) implementation to separate the up and down links connecting the basestation and mobile user. The circuits for the up and down link paths comprise similar components. The key components of each path, shown in an exemplary path in FIG. 3 with reference also to components in FIG. 2, include the input (local area) antenna 12 (closest to the mobile 110), low noise amplifier (LNA) 23, down-converting mixer 24, IF band filter 25, analog-to-digital converter (ADC) 26, optional numerically controlled oscillator (NCO) coupled to digital multiplier 31 to change IF sample rate if necessary for the subsequent filtering operations, digital processing section 160, a second NCO coupled to digital multiplier 33, digital-to-analog converter (DAC) 27, up-converting mixer 28, power amplifier (PA) 29, and output (donor) antenna 13. Digital processing section 160 includes functional blocks 162, 163, 164 and 165 described below which may preferably be implemented in digital signal processor (DSP) 15a or 15b (FIG. 1). (As used herein the term digital signal processor may include a programmed processor, discrete circuitry implementing digital processing functions, or a combination thereof.) Also, a pilot source 35 and additive coupling 37 may be provided for stabilizing echo cancellation as described below. As known to those skilled in the art, additional components may be included in the repeater 10. For example, first and second image reject filters may be included and located, e.g., between the LNA 23 and the down-converting mixer 24, and between the up-converting mixer 28 and the power amplifier 29, respectively. A first duplexer 11a may be provided between the antenna 12 and LNA 23. A circulator and a second duplexer 11b may be located, for example, between the PA 29 and the output antenna 13. Additional gain stages maybe present at various locations within the RF path or the IF path.

Figure 3:
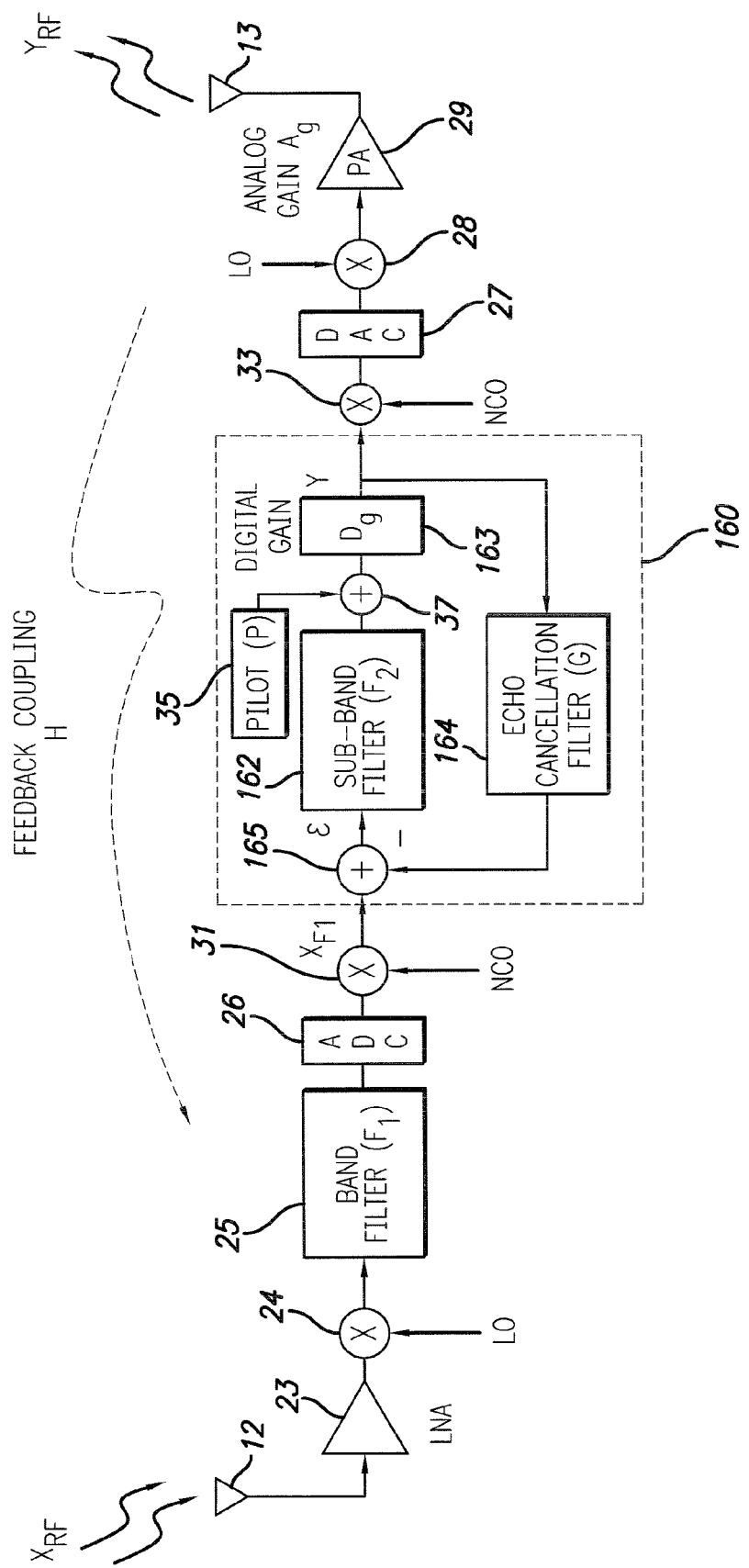
FIG. 3 is a high gain repeater with radiated feedback coupling H, echo cancellation G, and sub-band filtering $F_2$.

The block diagram shown in FIG. 3 provides more details of the feedback paths within the individual links, 10a or 10b. It also shows the RF coupling H between the input antenna 12 and the output antenna 13. In accordance with a preferred embodiment of the invention, the echo cancellation is implemented using internal feedback compensation in a DSP including echo cancellation filter 164 (as shown in FIG. 3). Other embodiments are possible where the DSP-based compensation is converted to analog, and possibly up-converted in frequency, then coupled to the IF or RF path. For convenience, not all of the components found typically in a repeater are shown, such as the image reject filters, circulators, and duplexers.

The input signal, the in-coming signal without the effects of feedback, is denoted by $x_{RF}(t)$. It's Fourier transform is denoted by $X_{RF}(\omega)$. The output signal and it's Fourier transform are denoted by $y_{RF}(t)$ and $Y_{RF}(\omega)$, respectively. Within FIG. 3, the forward gain of the repeater is represented as the product of the three gain blocks: an input analog gain, a digital gain, and an output analog gain, denoted by $A_{in}$, $D_g$, and $A_g$, respectively. For notational convenience, the input analog gain $A_{in}$ is combined into that of the filter 25 ($F_1$) and the output analog gain $A_g$ is combined into H. The frequency responses of the RF coupling between the antennas and the echo cancellation are denoted by $H(\omega)$ and $G(\omega)$, respectively. When converged the echo cancellation path matches the external coupling path: $G(\omega)=H(\omega) F_1(\omega)$.

The repeater shown in FIG. 3 differs, inter alia, from that described in the above noted '667 application because a sub-band filter 162 ($F_2$) has been added in the digital path that is common to the RF coupling loop ($H(\omega) F_1(\omega) F_2(\omega) D_g$) and the echo cancellation loop ($G(\omega) F_2(\omega) D_g$). The need for sub-band filtering arises when a operational frequency band of the repeater is split between several operators. Digital sub-band filtering is preferred when a given operator's spectrum comprises several non-contiguous sub-bands because of the ease of implementation over the analog alternative of a bank of IF SAW filters. However, the computation of the echo cancellation coefficients must be altered compared to that described in the above noted '667 application to accommodate the filter 162 ($F_2$), as will be described in detail later.

Figure 4:
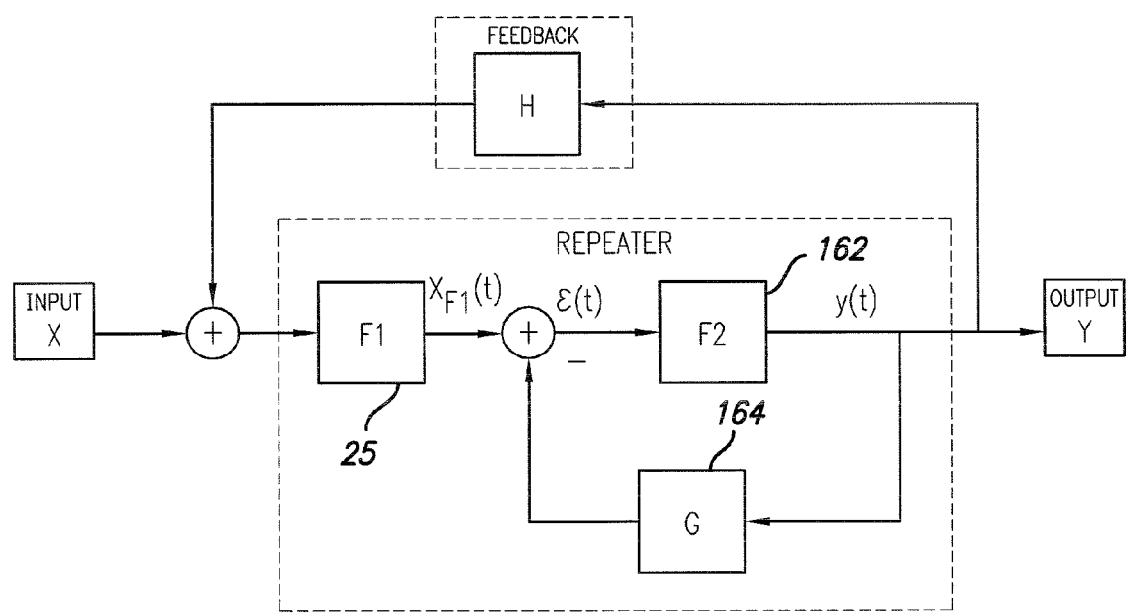
FIG. 4 is a simplified block diagram of a repeater with digital echo cancellation and sub-band filtering.

FIG. 3 is redrawn in FIG. 4 with all signals represented at baseband for simplicity while preserving the key components of the digital repeater. Blocks $F_1$ and $F_2$ provide band and sub-band filtering functions implemented by filters 25 and 162 (FIG. 3). Block H represents the unwanted external RF coupling. Block G is the echo cancellation filter that contains adjustable coefficients optimized to reduce the echo caused by this unwanted coupling. Additional signals shown in FIG. 4 include the input and output to the echo cancellation combiner, $x_{F1}(t)$ and $\epsilon(t)$, respectively. The former is the sum of the input signal x(t) and the feedback echo, filtered by $F_1$. The signal $\epsilon(t)$ is $$\varepsilon(t) = x_{F1}(t) - \sum_k g_k \cdot y(t - kT) \quad \text{(Eq. 1)}$$

where $g_k$ are the coefficients of the FIR (Finite Impulse Response) filter within block G and y(t) is the output signal of the digital processing section 160. The signal y(t) is also referred to as the digital output of the repeater because all subsequent stages are simply conversions from digital to RF. The output signal of the repeater, y(t), is the echo cancellation combiner output $\epsilon(t)$ filtered by the sub-band filter $F_2$. The signal after the echo cancellation, $\epsilon(t)$, is used along with the output signal y(t) to estimate the RF feedback coupling. The power spectrum of y(t) and the cross spectrum of $\epsilon(t)$ and y(t) are used herein in the estimation and subsequent iterative search for the optimum feedback cancellation coefficients, $g_k$.

The transfer function of the repeater is $$Y_{RF}(\omega) = \frac{F_1(\omega) \cdot F_2(\omega) \cdot D_g}{1 - F_2(\omega) \cdot D_g \cdot [F_1(\omega) \cdot H(\omega) - G(\omega)]} \cdot X_{RF}(\omega). \quad \text{(Eq. 2)}$$

$X_{RF}(\omega)$ is not available for measurement because the input antenna sums both $X_{RF}(\omega)$ and the coupled signal from the output antenna ($HY_{RF}$). However, (Eq. 2) makes the stability requirement explicit. The denominator must be positive for all frequencies. In general, the most important stability consideration is the interaction of the echo suppression ($F_1H-G$) and the digital gain $D_g$. Herein, the digital gain of the repeater is set low initially, then increased incrementally to a maximum gain, so that the echo cancellation can adapt and maintain stability throughout. The $F_2$ filter also affects the stability of the repeater. The stopband rejection of the sub-band filter $F_2$ reduces the repeater bandwidth and relaxes the echo suppression requirement in parts of the spectrum originally passed by the filter $F_1$. However, if the echo cancellation filter within G is designed to accommodate the entire $F_1$ bandwidth, the bandwidth reduction associated with the sub-band filter $F_2$ will mean that the coefficient set producing the maximum cancellation is not unique. Potential homogenous solutions must be constrained using "regularization," as discussed later, to prevent coefficient drift over time.

For the repeater shown in FIG. 4 where the filter 162 ($F_2$) is present, the echo is estimated using signals $\epsilon(t)$ and y(t). To perform echo cancellation successfully, the delay through the repeater must be long enough that the input and output signals, x(t) and y(t), respectively, are uncorrelated. If so, then the coefficients of the echo cancellation filter can be adjusted until the signals $\epsilon(t)$ and y(t) are uncorrelated.

Narrow bandwidth components within the input signal x(t) can cause the auto-correlation to overlap with the echo, which would cause a standard echo canceller to fail. The effect of such narrow bandwidth signal components can be reduced by normalizing the power spectrum of y(t) prior to computing the echo. Herein, both the cross spectrum of $\epsilon(t)$ and y(t), and the power spectrum of y(t) are normalized to make the echo canceller robust in the presence of narrow bandwidth components. In addition, a frequency mask is included to prevent signal energy outside of the passband of filter $F_2$ from influencing the estimation of the echo cancellation coefficients.

The digital sub-band filter $F_2$ splits the channel spectrum into several smaller bandwidth sub-bands. A cascade of digital functions comprising digital down conversion (DDC), lowpass filtering of a selected bandwidth, and digital up conversion (DUC) creates each sub-band. It is assumed that the DDC/DUC frequencies and lowpass bandwidths are selected such that the sub-bands do not overlap and, in addition, have at least a nominal gap in frequency between the respective passbands. For convenience, it is assumed that the delay introduced by each sub-band filter is made equal by padding shorter filter paths with additional delay.

1 Adaptive Echo Cancellation Theory

Echo cancellation comprises two parts: the estimation of the coefficient error vector, denoted by $\Delta g$; and the update of the coefficient vector, denoted by g. Estimation and update are discussed in sections 1.1 and 1.2, respectively.

1.1 Error Estimation

The error in the echo cancellation coefficients is estimated using a least mean square (LMS) approach. We wish to find $\Delta g_k$ that minimize the following:

$$J = E[|r|^2] \quad \text{(Eq. 3)}$$

where E[ ] denotes expected value, $\Delta g_k$ is the error in the coefficient $g_k$, and $$r(t) = \varepsilon(t) - \sum_k \Delta g_k \cdot y(t - kT). \quad \text{(Eq. 4)}$$

The solution $\Delta g$ that minimizes (Eq. 3) is obtained by solving the following set of simultaneous equations at various time offsets nT:

$$E[\varepsilon(t) \cdot y^*(t - nT)] = \sum_k \Delta g_k \cdot E[y(t - kT) \cdot y^*(t - nT)]. \quad \text{(Eq. 5)}$$

If it is assumed that y(t) is wide-sense stationary for an observed interval [$t_1, t_2$], the auto-correlation of y(t) is $$E[y(t - kT) \cdot y^*(t - nT)] = E[y(t) \cdot y^*(t - (n-k) \cdot T)] = a_{n-k}. \quad \text{(Eq. 6)}$$

The cross-correlation of $\epsilon(t)$ and y(t) is $$E[\varepsilon(t) \cdot y^*(t - nT)] = c_n. \quad \text{(Eq. 7)}$$

The simultaneous equations of (Eq. 5) may be rewritten in matrix form as $$p = Q \cdot \Delta g \quad (Eq. 8)$$

where $$p = [c_0 \ldots c_{K-1}]^T \quad (Eq. 9)$$

$$\Delta g = [\Delta g_1 \ldots \Delta g_K]^T \quad (Eq. 10)$$

$$Q = \begin{bmatrix} a_0 & \ldots & a_{K-1} \\ \vdots & a_0 & \vdots \\ (a_{K-1})^* & \ldots & a_0 \end{bmatrix}. \quad (Eq. 11)$$

Note that Q is a Toeplitz matrix whose real component is symmetric and imaginary component is anti-symmetric.

In general, Q will not have full rank when the filter $F_2$ reduces the bandwidth of the repeater path. As a result, the solution for $\Delta g_k$ is not unique. In such cases, either singular value decomposition (SVD) or a regularization method is employed to obtain a solution with favorable coefficients. A regularization that favors smaller changes in coefficients minimizes the following:

$$J = (p - Q \cdot \Delta g)^H \cdot (p - Q \cdot \Delta g) + \gamma \cdot \Delta g^H \cdot \Delta g \quad (Eq. 12)$$

where the second term penalizes variations in the estimated coefficient error, γ is a positive scalar constant that weights the relative importance of the data fit and the desire for minimal coefficient changes, and $( )^H$ indicates conjugate transpose. Thus the favored estimate of $\Delta g_k$ becomes $$\Delta g = M \cdot p \quad (Eq. 13)$$

where $$M = [Q^H \cdot Q + \gamma \cdot I]^{-1} \cdot Q^H \quad (Eq. 14)$$

M is a referred to as a "pseudo-inverse of Q", I is the identity matrix, and γ is chosen to be some fraction of the trace of Q. Another pseudo-inverse of Q in common use is $$M = [Q + \gamma \cdot I]^{-1}. \quad (Eq. 15)$$

The regularization provided by (Eq. 14) and (Eq. 15) are referred to as the "penalty method" and "diagonal padding," respectively, within the results section.

Singular value decomposition (SVD) creates a pseudo-inverse by selecting a fixed number of the dominant eigenvalues, denoted by D, and associated eigenvectors then inverting the selected eigenvalues. The remaining eigenvalues are set to zero. Thus, we have $$M = V^H \cdot \Omega_D \cdot V \quad (Eq. 16)$$

where $\Omega_D = \text{diag}\{\lambda_1^{-1}, \ldots, \lambda_D^{-1}, 0, \ldots 0\}$ assuming the eigenvalues are ordered such that $\lambda_1 > \lambda_2 > \ldots > \lambda_K$; and V is a matrix whose columns $v_k$ are the eigenvectors of Q and is denoted by $$V = [v_1 \ldots v_K]. \quad (Eq. 17)$$

1.2 Echo Cancellation Coefficient Update

Equation (Eq. 13) provides an estimate of the coefficient error that is used to adjust G iteratively to improve the echo cancellation:

$$g(t_{i+1}) = g(t_i) - \beta \cdot M \cdot p \quad (Eq. 18)$$

where $$g = [g_1 \ldots g_K]^T, \quad (Eq. 19)$$

and β is a scale factor controlling the convergence of the iterative sequence. The matrix M used as the pseudo-inverse of Q affects the convergence properties of the iterative sequence and also the steady-state value of G. When M=I, the update is referred to as a "steepest descent".

The convergence factor β is chosen ideally as a function of the cross-correlation vector p such that $$\beta \leq \frac{p^H \cdot M \cdot p}{p^H \cdot M \cdot Q \cdot M \cdot p}. \quad (Eq. 20)$$

If p is an eigenvector of MQ, then (Eq. 20) becomes $$\beta \leq \frac{v_k^H \cdot M \cdot v_k}{v_k^H \cdot M \cdot Q \cdot M \cdot v_k} = \frac{1}{\lambda_{MQ(k)}} \quad (Eq. 21)$$

where $\lambda_{MQ(k)}$ and $v_k$ are the $k^{th}$ eigenvalue and eigenvector of MQ, respectively. The eigenvalues are ordered by descending magnitude making $\lambda_{MQ(1)}$ the largest. Often the convergence factor is chosen to be constant instead of as a function of p. The constant is chosen conservatively to ensure that the sequence converges for all p: thus $$\beta \leq \frac{1}{\lambda_{MQ(1)}}. \quad (Eq. 22)$$

The coefficient error vector $\Delta g$ at a time $t_0$ can be defined as a weighted sum of the eigenvectors of MQ:

$$\underline{\Delta g}(t_0) = \sum_k \alpha_k(t_0) \cdot \underline{v}_k \quad (Eq. 23)$$

where $\alpha_k(t_0)$ are complex weights at time $t_0$. Now consider the coefficient error after a single iteration, at time $t_1$. From (Eq. 18), we have $$\Delta g(t_1) = \Delta g(t_0) - \beta \cdot M \cdot p. \quad (Eq. 24)$$

From (Eq. 8), we get $$\Delta g(t_1) = \Delta g(t_0) - \beta \cdot M \cdot Q \cdot \Delta g(t_0). \quad (Eq. 25)$$

From (Eq. 23), we have $$\underline{\Delta g}(t_1) = \sum_k \alpha_k(t_0) \cdot (1 - \beta \cdot \lambda_{MQ(k)}) \cdot \underline{v}_k. \quad (Eq. 26)$$

After n iterations, we have $$\alpha_k(t_n) = \alpha_k(t_0) \cdot (1 - \beta \cdot \lambda_{MQ(k)})^n \quad (Eq. 27)$$

It can be seen from (Eq. 27) that the weights $\alpha_k$ associated with the dominant eigenvectors will converge quickly towards zero whereas the $\alpha_k$ for the remaining eigenvectors associated with small eigenvalues of MQ will not converge in any reasonable number of iterations because $\beta \lambda_{MQ(k)}$ is much less than unity.

When M is an approximate inverse of Q, the dominant eigenvalues of MQ have a smaller spread than those of Q alone. As a result, the weights $\alpha_k$ associated with the dominant eigenvectors of MQ will converge evenly.

Singular value decomposition normalizes the dominant eigenvalues and sets the remaining eigenvalues to zero. As a result, the steady-state solution of g will be the weighted sum of the dominant eigenvectors retained in the decomposition.

2 Implementation

The echo cancellation is part of an iterative cycle that computes p and M to update g. It is desirable to perform this cycle using computational efficient algorithms including the fast Fourier transform (FFT) and its inverse (IFFT), and to exploit favorable properties of Toeplitz and circulant matrices in solving simultaneous equations.

It is assumed that each iteration captures blocks of 16K samples before adjusting the echo cancellation coefficients g. Rather than computing the auto- and cross-correlations directly on the 16K sample block, the block is separated into overlapping 4K samples blocks using a time-domain window. The expected values of the auto- and cross-correlations are estimated using the power spectrum and cross spectrum accumulated over from several 4K blocks. Using the accumulated cross-spectrum and power spectrum, instead of a direct computation of the respective correlations, has the benefit of low memory usage (4K) while allowing time averaging over a long interval (16K). The 4K-block size was chosen to provide sufficient resolution for GSM signals. Larger blocks can be used if memory is available.

The sliding window used to isolated the 4K blocks is denoted by $h_{fft}$. It is currently a Hann window. The Fourier transforms of the windowed signals of y(t) and ε(t), centered at time $t_k$, are $$Y(\omega, t_k) = FFT\{h_{fft}(t-t_k) \cdot y(t)\} \quad \text{(Eq. 28)}$$

and $$E(\omega, t_k) = FFT\{h_{fft}(t-t_k) \cdot \epsilon(t)\}. \quad \text{(Eq. 29)}$$

The accumulated power spectrum of y(t) and the accumulated cross spectrum of ε(t) and y(t) are $$S_{yy}(\omega) = \sum_k Y(\omega, t_k) \cdot Y^*(\omega, t_k) \quad \text{(Eq. 30)}$$

and $$C_{\epsilon y}(\omega) = \sum_k E(\omega, t_k) \cdot Y^*(\omega, t_k). \quad \text{(Eq. 31)}$$

The auto- and cross-correlations are $$[a_0 \ldots a_{N-1}]^T = IFFT\{S_{yy}(\omega)\} \quad \text{(Eq. 32)}$$

and $$[c_0 \ldots c_{N-1}]^T = IFFT\{C_{\epsilon y}(\omega)\} \quad \text{(Eq. 33)}$$

where N is the size of the FFT used to compute the power spectrum $S_{yy}(\omega)$. Note that due to the FFT computation, $$a_{-k} = a_{N-k} \quad \text{(Eq. 34)}$$

and $$c_{-k} = c_{N-k}. \quad \text{(Eq. 35)}$$

2.1 Spectral Normalization Using the Power Spectrum of y(t)

A direct implementation of the coefficient estimation, (Eq. 13), can be a large computational burden when K is large because matrix inverses are of order $K^3$, in general. Fortunately the structure of the matrix Q allows some computational efficiency. The matrix Q is Toeplitz and when N=K it is circulant. Although there is no need for K to be as large as N to model the feedback coupling, the computational efficiencies of solving an equation containing a circulant matrix is N log N. Thus, $$\Delta \underline{g} = IFFT\left\{\frac{FFT\{\underline{c}\}}{FFT\{\underline{a}\}}\right\} = IFFT\left\{\frac{C_{\epsilon y}(\omega)}{S_{yy}(\omega)}\right\} \quad \text{(Eq. 36)}$$

if there are no zeros in $S_{yy}(\omega)$. Unfortunately, the stopband rejection of the sub-band filter $F_2$ (on the order of −40 dB) may introduce near zero values into $S_{yy}(\omega)$.

Two modifications are possible to allow a solution. The first modification is to inject a broadband pilot signal P (via pilot source 35 and additive coupler 37, FIG. 3) after the $F_2$ filter block. The goal is to add spectral energy into the feedback signal at frequencies corresponding to the zeros of the original $S_{yy}(\omega)$ introduced by the $F_2$ filter. The additive pilot signal must be uncorrelated with itself over the delay range spanned by the echo cancellation filter. The new $S_{yy}(\omega)$ contains additional spectral energy whose response is $|H(\omega) F_1(\omega)|^2 P(\omega)$ where $P(\omega)$ is the pilot power spectrum.

For the second modification, the estimation is frequency weighted using a mask $H_{mask}(\omega)$:

$$IFFT\left\{H_{mask}(\omega) \cdot \frac{C_{\epsilon y}(\omega)}{S_{yy}(\omega)}\right\} = \Delta \underline{g} * \underline{h}_{mask} \quad \text{(Eq. 37)}$$

where * indicates a convolution in the time domain. As long as the mask $H_{mask}(\omega) = 0$ for all ω where $S_{yy}(\omega) < \delta$, a solution is obtained. This solution is convolved by $h_{mask}$, which is not desired. However, it does suggest that normalization of the cross- and power spectrums can be beneficial.

Let us normalize by $S_{yy}(\omega)/H_{mask}(\omega)$: that is, the estimates of the cross- and auto-correlation obtained from normalized cross and power spectrums are $$[c_0 \ldots c_{N-1}]^T = IFFT\left\{H_{mask}(\omega) \cdot \frac{C_{\epsilon y}(\omega)}{S_{yy}(\omega)}\right\} \quad \text{(Eq. 38)}$$

and $$[a_0 \ldots a_{N-1}]^T = IFFT\{H_{mask}(\omega)\}. \quad \text{(Eq. 39)}$$

The new solution to $\Delta g_k$ becomes $$p_N = Q_N \cdot \Delta g \quad \text{(Eq. 40)}$$

where $$p_N = [c_0 \ldots c_{M-1}]^T \quad \text{(Eq. 41)}$$

and $$Q_N = \begin{bmatrix} a_0 & \ldots & a_{M-1} \\ \vdots & a_0 & \vdots \\ (a_{M-1})^* & \ldots & a_0 \end{bmatrix}, \quad \text{(Eq. 42)}$$

which replaces (Eq. 8).

Note that the auto-correlation, (Eq. 39), is only a function of the frequency weighting mask $H_{mask}(\omega)$ and not the power spectrum of y(t). As a result, $Q_N$ and the pseudo-inverse M can be computed one-time for each mask then re-used thereafter.

3 Stability Measures

The stability of the repeater is related to the open loop gain of the system:

$$L(\omega) = D_g \cdot F_2(\omega) \cdot [F_1(\omega) \cdot H(\omega) - G(\omega)]. \quad \text{(Eq. 43)}$$

To be stable, $|L(\omega)| < 1$ for all frequencies $\omega$. However, an additional margin of stability is preferred before increasing the repeater gain, $D_g$. In general the echo cancellation must ensure that $|L(\omega)| < 0.1$ for all frequencies $\omega$ before considering increasing the gain of the repeater. Within the simulink simulation, this measure can be computed; however, in a practical implementation the frequency response of $H(\omega)$ is not known.

The stability of the system can also be inferred from the normalized cross-correlation. Herein, the stability margin, denoted by $\eta$, is computed as $$\eta = 10 \cdot \log 10 \left\{ \frac{\sum_{k=1}^{K} |c_k|^2}{\max_{k=1,N} \{|c_k|^2\}} \right\} \quad \text{(Eq. 44)}$$

where K is the number of filter taps and $\max_{k=1:N}$ is the maximum of the entire N point IFFT.

The loop gain of the repeater, excluding the echo cancellation, is $$L_o(\omega) = D_g \cdot F_2(\omega) \cdot F_1(\omega) \cdot H(\omega). \quad \text{(Eq. 45)}$$

When $L_o(\omega) \gg L(\omega)$, say 10 dB or more, and the repeater is stable, the following approximation can be made $$L_o(\omega) \approx D_g \cdot F_2(\omega) \cdot G(\omega), \quad \text{(Eq. 46)}$$

which is preferred over (Eq. 45) because $G(\omega)$ is available as a measurement within the digital circuitry.

It is desirable to quantify the loop gain (without cancellation) by a single RMS value instead of a function of $\omega$:

$$J = D_g \cdot \left[ \frac{\sum_\omega |F_2(\omega)|^2 \cdot |G(\omega)|^2}{\sum_\omega |F_2(\omega)|^2} \right]^{0.5} \quad \text{(Eq. 47)}$$

$$\approx D_g \cdot \left[ \frac{\sum_{\omega(F2)} |G(\omega)|^2}{\sum_{\omega(F2)} 1} \right]^{0.5}$$

where $\omega(F2)$ indicates frequencies within the $F_2$ passband.

4 Simulated Test Results

The digital repeater, including sub-band filtering and echo cancellation, and the external RF feedback coupling between antennas are simulated using Simulink. The estimation of the echo coefficients error is implemented using Matlab code that processes 16K blocks of data associated with $\epsilon(t)$ and $y(t)$.

Figure 5:
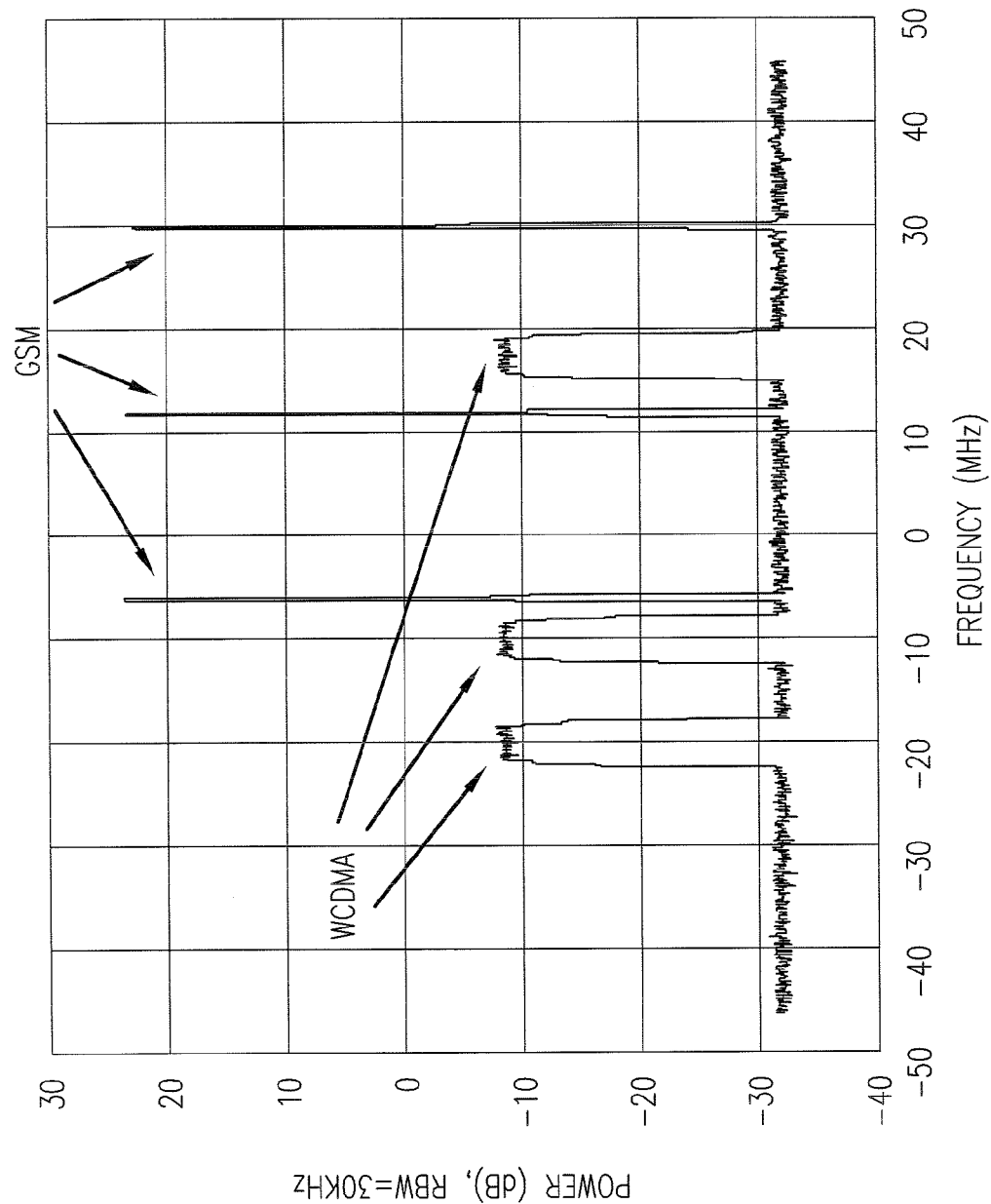
FIG. 5 is a simulated input power spectrum, including LNA noise, of a digital repeater with three WCDMA carriers and three GSM carriers.
Figure 6:
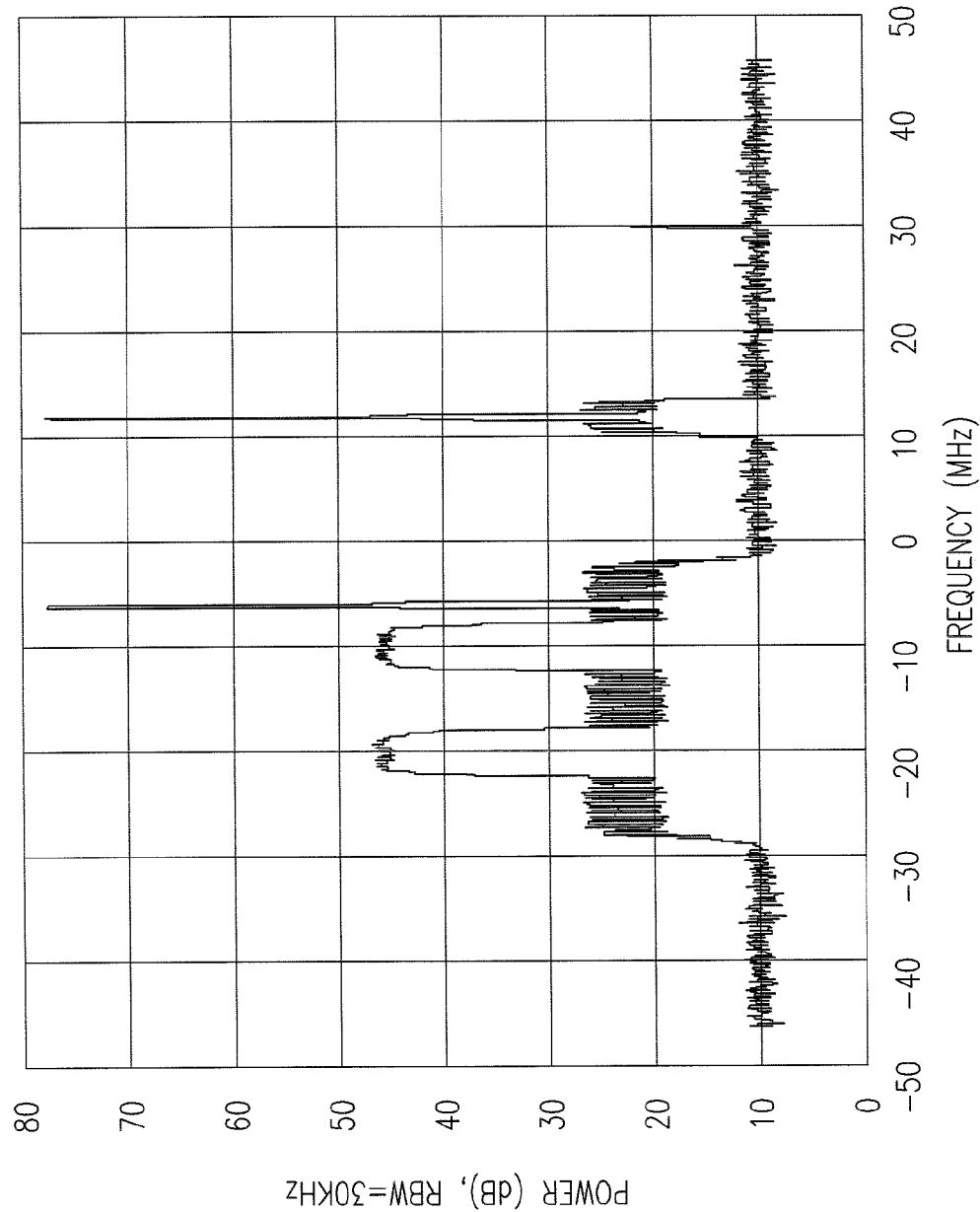
FIG. 6 is a simulated output power spectrum, including the effects of sub-band filter $F_2$ and some residual echo, of a digital repeater with three WCDMA carriers and three GSM carriers.
Figure 7:
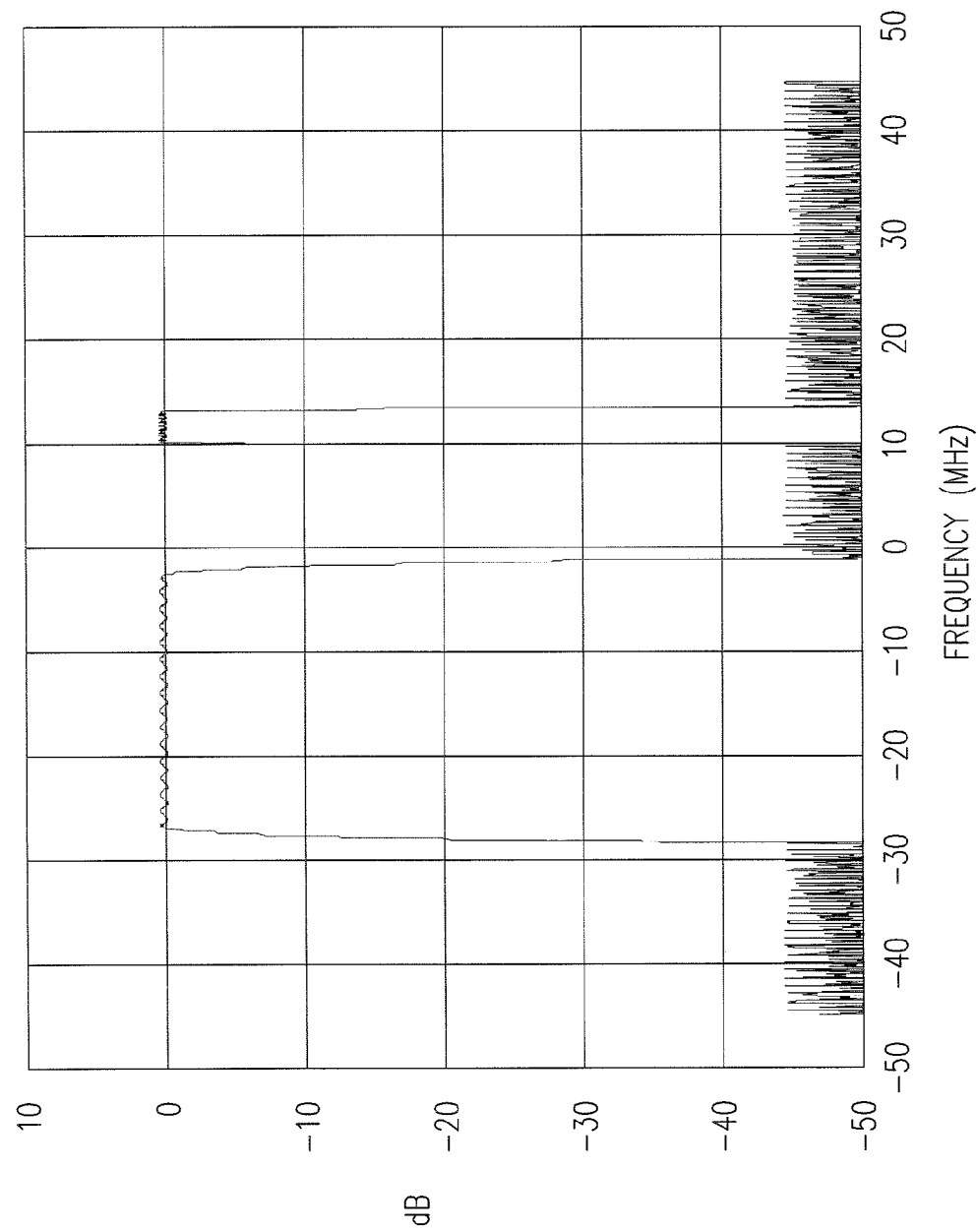
FIG. 7 is a simulated frequency response of the sub-band filter, $|F_2(\omega)|$, employed in the digital repeater.

The input signal $x(t)$ comprises three WCDMA carriers and three GSM carriers. The input and output power spectra are shown in FIG. 5 and FIG. 6, respectively. The frequency response of the sub-band filter $F_2$ is shown in FIG. 7. The effect of the sub-band filter is apparent when the input and output spectra are compared.

The filter $F_2$ in this example has two sub-bands with different bandwidths. The first sub-band is 25 MHz wide and centered at −12.5 MHz (baseband), capturing two WCDMA carriers and one GSM carrier within its passband. One GSM carrier lies within the passband of the second sub-band filter centered at 12.5 MHz with a bandwidth of 2.5 MHz. The remaining WCDMA and GSM carriers are interfering signals located outside of the filter $F_2$ passbands.

The above-mentioned input signal and sub-band filter $F_2$ are used to illustrate regularization, normalization, and frequency weighting. The regularization options include singular value decomposition (SVD) (Eq. 16), penalty method (Eq. 14), diagonal padding (Eq. 15), and the steepest descent (M=I). The power spectrum normalization is based on (Eq. 38) and (Eq. 39). The frequency weighting is equal to the squared magnitude of the $F_2$ filter response. The results from the echo cancellation using SVD, power spectrum normalization, and $|F_2(\omega)|^2$ frequency weighting are shown below.

The success of a given regularization approach is related to the spread of the dominant eigenvectors of MQ. Most of the lesser eigenvalues can be ignored or set to zero because of the bandwidth reduction associated with the sub-band filter $F_2$. The challenge is to determine how many dominant eigenvalues are necessary for a given filter $F_2$.

Figure 8:
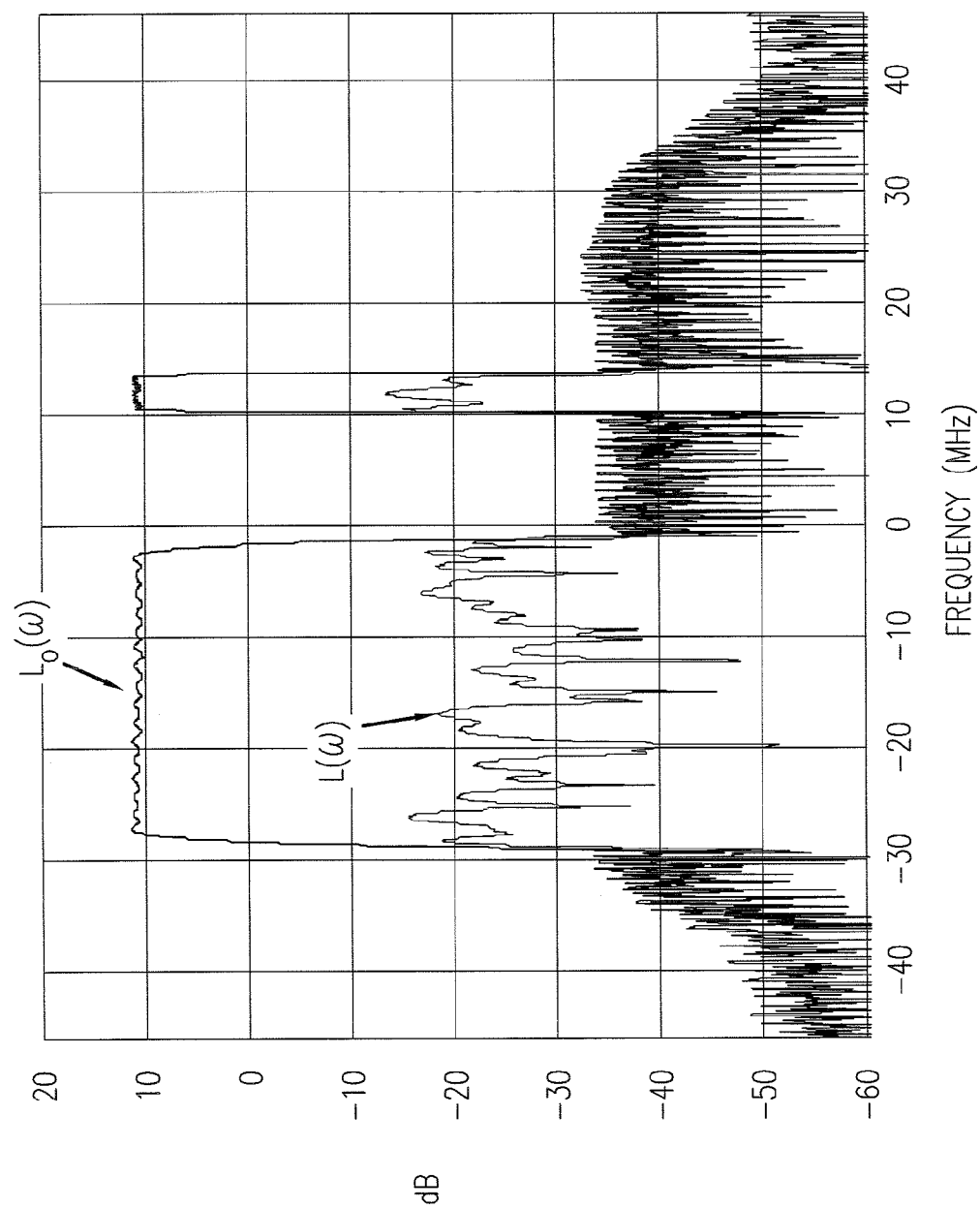
FIG. 8 is a simulated open loop gain of the repeater, with and without echo cancellation ($L(\omega)$ and $L_o(\omega)$, respectively. $|F_2|^2$ frequency weighting and SVD comprising 25 dominant eigenvectors is used.
Figure 9:
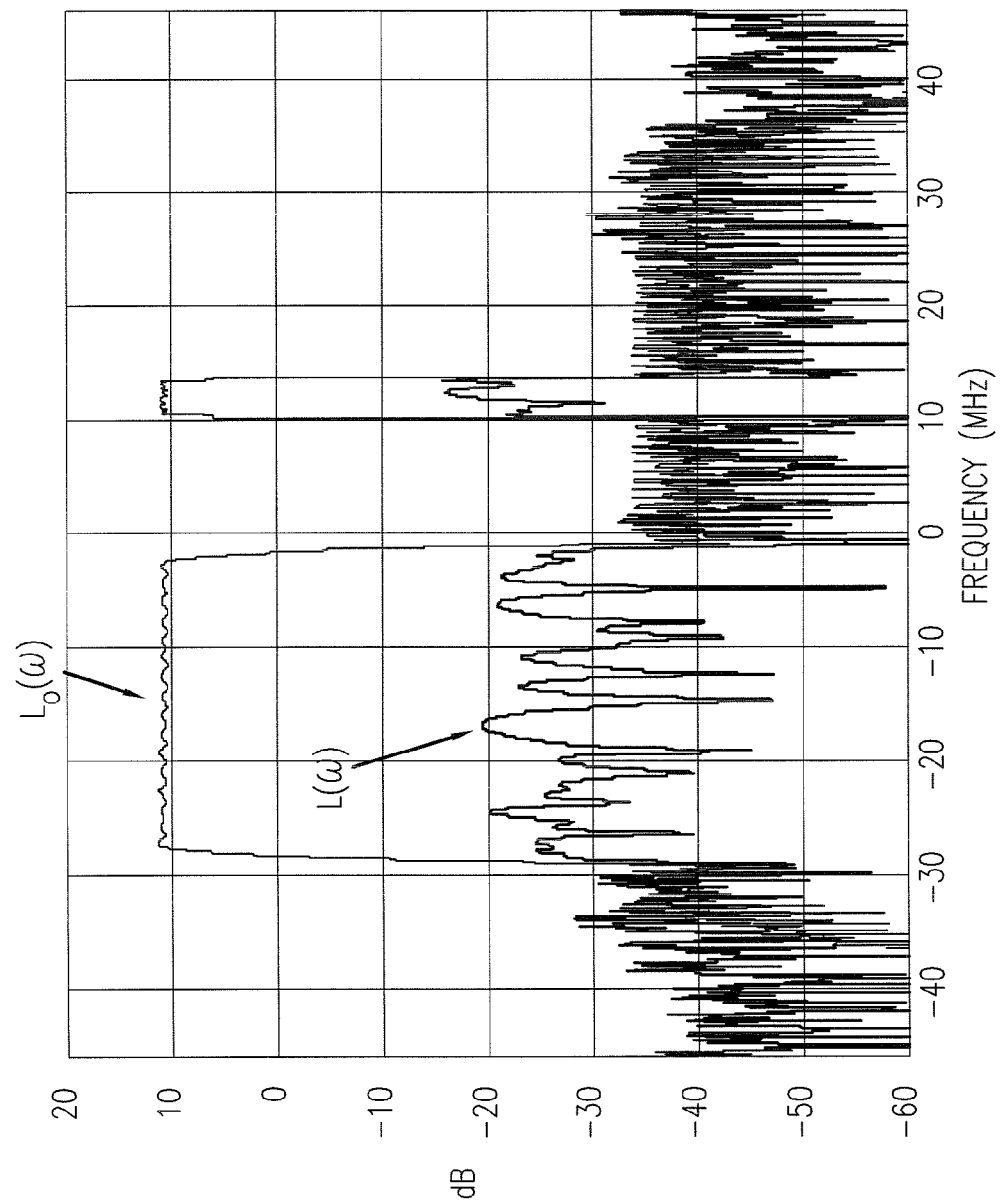
FIG. 9 is a simulated open loop gain of the repeater, with and without echo cancellation ($L(\omega)$ and $L_o(\omega)$, respectively. $|F_2|^2$ frequency weighting and SVD comprising 35 dominant eigenvectors is used.
Figure 10:
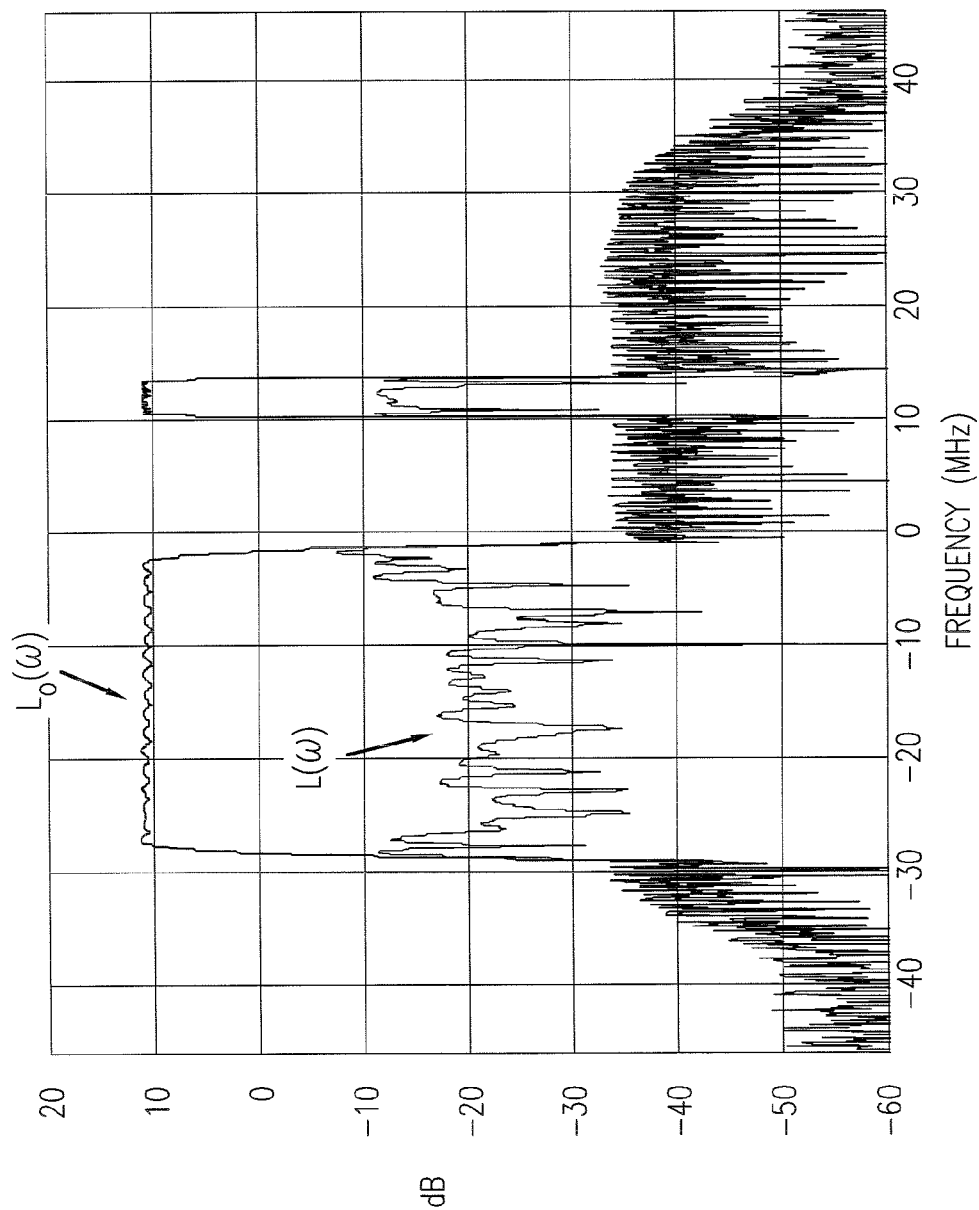
FIG. 10 is a simulated open loop gain of the repeater, with and without echo cancellation ($L(\omega)$ and $L_o(\omega)$, respectively. $|F_2|^2$ frequency weighting and SVD comprising 24 dominant eigenvectors is used.

The open loop gain of the repeater, $L(\omega)$ in (Eq. 43), when the repeater gain $D_g$ is at its maximum setting, is shown in FIG. 8, FIG. 9, and FIG. 10 for the case of 25, 35, and 24 dominant eigenvectors. The 25 dominant eigenvector case provides an open loop gain that is less than −10 dB for all frequencies $\omega$, as desired. Increasing the number of eigenvalues to 35 provides a slight improvement in echo cancellation; however, it is apparent by comparing FIG. 8 and FIG. 9 that the open loop gain for frequencies outside of the passband of the $F_2$ filter begin to rise as the number of dominant eigenvalues is increased beyond 25. This is undesirable. In contrast, FIG. 10 indicates the 24 dominant eigenvectors is not sufficient to maintain the desired −10 dB stability margin ($L(\omega) > −10$ dB at −2 MHz), when the repeater gain is at its maximum value.

Figure 11:
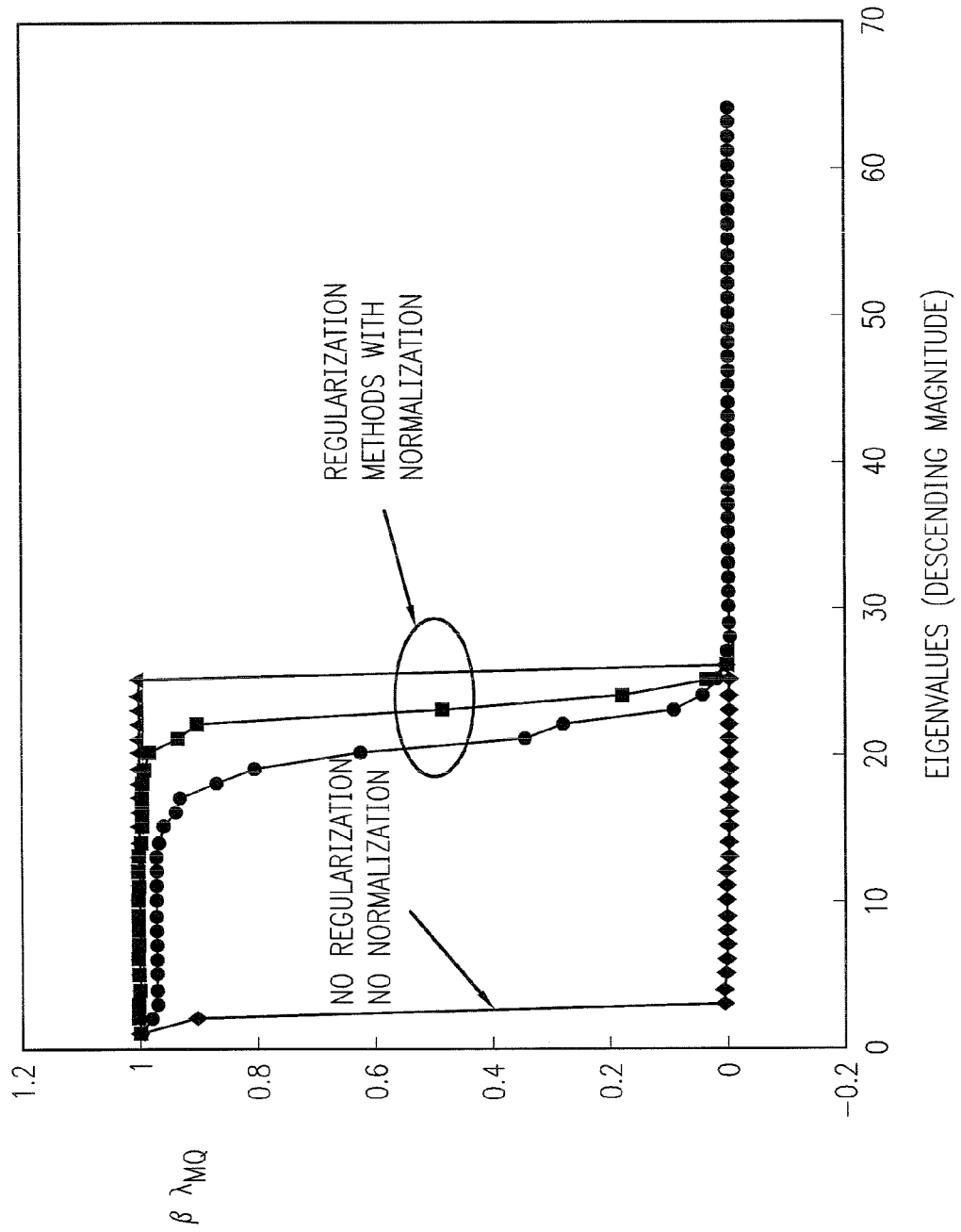
FIG. 11 is a simulated plot of eigenvalues of MQ using a frequency weighting of $|F_2|^2$. Left trace indicates eigenvalues for steepest descent (M=I) without spectral normalization.
Figure 12:
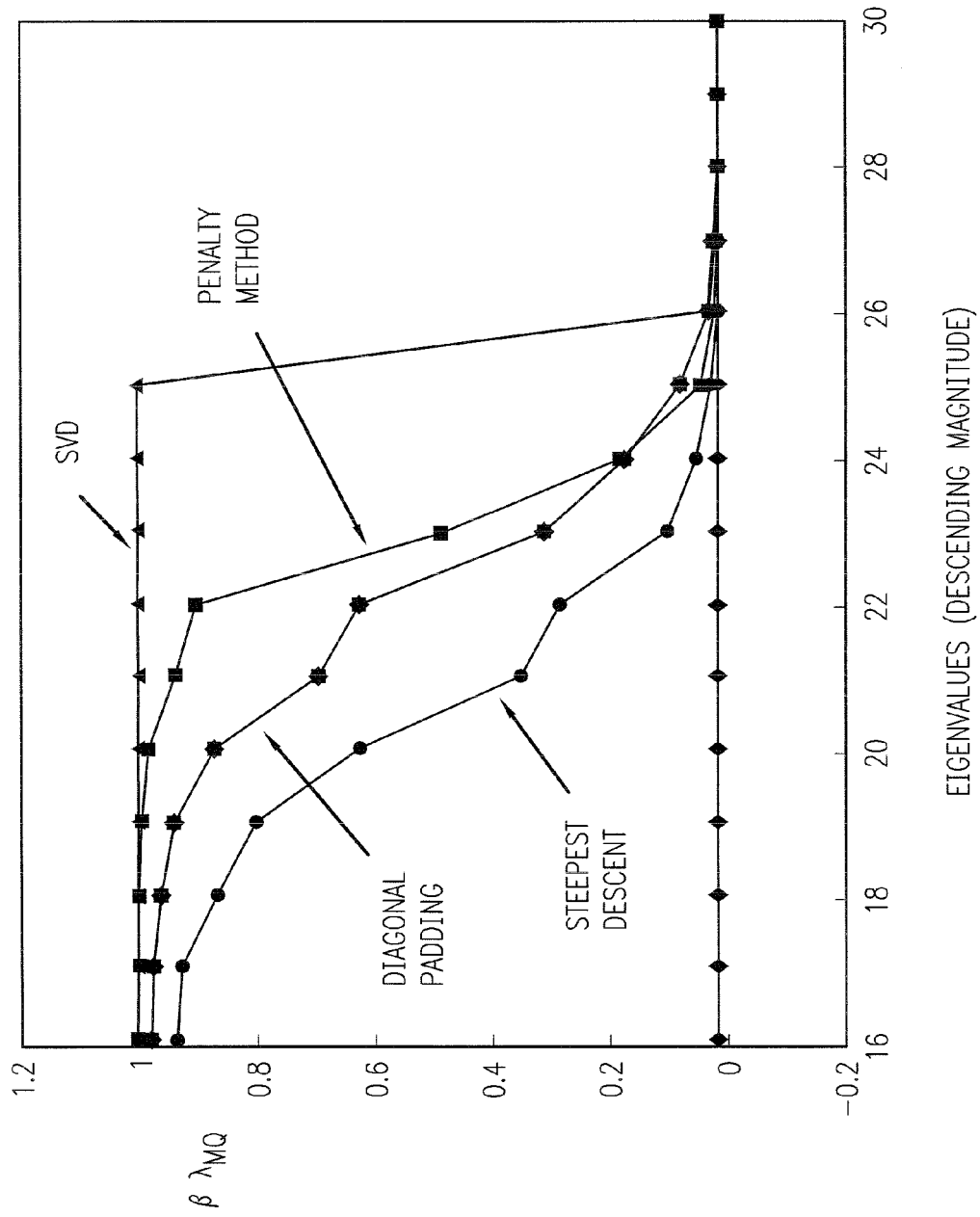
FIG. 12 is an expanded view of eigenvalues of MQ using a frequency weighting of $|F_2|^2$ with regularization and spectral normalization.

The eigenvalue distribution for a frequency weighting of $|F_2|^2$ is shown in FIG. 11 and FIG. 12, the later is an expanded view of the former that highlights the difference between the regularization methods. Both regularization and normalization by the power spectrum have a large effect on the number of dominant eigenvectors available to the search for the best echo cancellation. Without normalization or regularization, only two dominant eigenvalues are available (see left most trace in FIG. 11), which does not provide a sufficient number of eigenvectors to create a useful echo cancellation coefficient set (see (Eq. 23)). The third eigenvalue is lower than 0.005 of the maximum $\lambda_{MQ}$, which means the modes of the echo cancellation filter projecting onto the 62 smaller eigenvectors will not converge in any reasonable amount of time.

In contrast, all four regularization methods applied to a normalized spectrum provide several dominant eigenvalues that are at least 0.5 of the maximum eigenvalue: steepest descent has 20, diagonal padding has 22, penalty method has 22, and the singular value decomposition has 25. The sub-band filter $F_2$ reduces the bandwidth by 0.32, which suggests that at least 21 (0.32*64) dominant eigenvectors are needed.

It is clear that normalization by the power spectrum is important for good echo cancellation performance when narrowband signals such as GSM are present. The SVD regularization method with 25 dominant eigenvalues appears to be the best approach for the $F_2$ filter shown in FIG. 7; however, the optimal number of dominant eigenvalues is expected to change if the sub-band filter is altered. The other regularization methods provide similar steady-state results, but the eigenvalue distribution in FIG. 12 suggests that the SVD will have slightly better convergence properties.

The present invention has been described in relation to a presently preferred embodiment, however, it will be appreciated by those skilled in the art that a variety of modifications, too numerous to describe, may be made while remaining within the scope of the present invention. Accordingly, the above detailed description should be viewed as illustrative only and not limiting in nature.

What is claimed is:

1. A wireless repeater, comprising:
an input antenna for receiving an input signal;
an output antenna for outputting an amplified signal;
an amplifier for amplifying the received input signal and providing the output amplified signal to the output antenna;
a band filter for limiting the input signal to an operational frequency band of the repeater;
a sub-band filter for limiting the output of the band filter to one or more sub-bands within the operational frequency band of the repeater; and
a digital feedback path coupled to the output of the sub-band filter and including a digital signal processor for adaptively canceling an echo between the output antenna and the input antenna by implementing an adaptive algorithm based on cross and autocorrelation measurements obtained from the power spectrum of a signal representing the digital output of the repeater and the cross spectrum of the same repeater digital output signal with the repeater input signal after echo cancellation, where the cross and power spectra are normalized by the power spectrum.

2. A wireless repeater as set out in claim 1, wherein the band filter comprises an analog filter.

3. A wireless repeater as set out in claim 1, wherein the sub-band filter comprises a digital filter and the repeater comprises a down converter and analog to digital converter before the digital sub-band filter.

4. A wireless repeater as set out in claim 1, wherein the digital signal processor implements a frequency weighting mask to weight the cross and power spectrums.

5. A wireless repeater as set out in claim 1, further comprising a pilot signal source coupled to insert a broad spectrum pilot signal to the output of the sub-band filter to assist in the calculation of the cross and power spectrums.

6. A wireless repeater as set out in claim 5, wherein the pilot signal is added to the output of the sub-band filter and the pilot signal is uncorrelated with itself over a delay range spanned by the echo cancellation feedback cancellation algorithm.

7. A wireless repeater as set out in claim 1, wherein the digital signal processor implements said algorithm employing a digital filtering operation to cancel echoes using adaptive filter coefficients.

8. A wireless repeater as set out in claim 7, wherein changes in said adaptive filter coefficients are regularized by the algorithm to favor smaller changes in the coefficients.

9. A wireless repeater as set out in claim 8, wherein said changes in said adaptive filter coefficients are regularized by said algorithm employing one of singular value decomposition, penalty method, diagonal padding, and the steepest descent method.

10. A wireless repeater as set out in claim 1, wherein the input signal comprises a narrowband signal.

11. A wireless repeater as set out in claim 10, wherein the input signal further comprises a wideband signal.

12. A wireless repeater as set out in claim 11, wherein the narrowband signal comprises a GSM signal and the wideband signal comprises a CDMA signal.

13. A wireless repeater as set out in claim 1, wherein the repeater is an on frequency repeater.

14. A wireless repeater as set out in claim 1, wherein the repeater is a frequency division duplex bi-directional repeater.

15. A method for echo cancellation in a wireless repeater having an input antenna and output antenna, comprising:
receiving an input signal in a signal path of the wireless repeater;
filtering the input signal to an operational band of the repeater to provide a band filtered signal;
providing a sub-band filtering operation to the band filtered signal to limit the signal to one or more sub-bands within the operational band;
determining cross and autocorrelations obtained from the power spectrum of a signal representing the digital output of the repeater and the cross spectrum of the same repeater digital output signal with the repeater input signal after echo cancellation, where the cross and power spectra are normalized by the power spectrum; and
canceling an echo between the output antenna and the input antenna by implementing an adaptive filtering operation in a digital feedback path including the output of the sub-band filtering operation by employing adaptive filter coefficients based the on cross and autocorrelations obtained from the normalized cross and power spectra.

16. A method as set out in claim 15, further comprising regularizing changes in said adaptive filter coefficients to favor smaller changes in said coefficients.

17. A method as set out in claim 16, wherein said regularizing comprises employing one of singular value decomposition, penalty method, diagonal padding, and the steepest descent method.

18. A method as set out in claim 15, wherein said normalizing comprises employing a frequency weighting mask to weight the cross and power spectrums.

19. A method as set out in claim 15, wherein said normalizing comprises inserting a broad spectrum pilot signal to the output of the sub-band filter to assist in the calculation of the cross and power spectrums.

20. A method as set out in claim 15, wherein said repeater is an on frequency repeater and wherein said input signal comprises a narrowband signal.

* * * * *